United States Patent
Nowak

(10) Patent No.: US 10,281,118 B2
(45) Date of Patent: May 7, 2019

(54) TOOL-LESS APPARATUS AND METHOD FOR SECURING LIGHTING ENCLOSURE COVER

(71) Applicant: David Nowak, Powell, TN (US)

(72) Inventor: David Nowak, Powell, TN (US)

( * ) Notice: Subject to any disclaimer, the term of this patent is extended or adjusted under 35 U.S.C. 154(b) by 8 days.

(21) Appl. No.: 15/793,378

(22) Filed: Oct. 25, 2017

(65) Prior Publication Data

US 2018/0142868 A1 May 24, 2018

Related U.S. Application Data

(60) Provisional application No. 62/425,142, filed on Nov. 22, 2016.

(51) Int. Cl.
*F21V 17/18* (2006.01)
*F21S 8/02* (2006.01)

(52) U.S. Cl.
CPC ............... *F21V 17/18* (2013.01); *F21S 8/02* (2013.01)

(58) Field of Classification Search
CPC ...................................... F21V 17/18
USPC ........................................ 174/559
See application file for complete search history.

(56) References Cited

U.S. PATENT DOCUMENTS

| | | | | |
|---|---|---|---|---|
| 6,011,217 A * | 1/2000 | Chen | ............... | H01R 13/516 174/551 |
| 6,573,448 B2 * | 6/2003 | Mayer | ............... | H05K 5/0069 174/481 |
| 7,208,686 B1 * | 4/2007 | Chen | ............... | G06F 1/181 174/559 |
| 8,148,633 B2 * | 4/2012 | Hung | ............... | G06F 1/1626 174/50 |
| 8,163,994 B2 * | 4/2012 | Taniguchi | ............... | H02G 3/081 174/50 |
| 8,410,359 B2 * | 4/2013 | Richter | ............... | H02G 15/007 174/50 |
| 2009/0073700 A1 * | 3/2009 | Cruickshank | ............... | F21K 9/00 362/373 |
| 2009/0241697 A1 * | 10/2009 | Kato | ............... | G08B 17/10 73/863.81 |
| 2014/0097019 A1 * | 4/2014 | Chan | ............... | H02G 3/086 174/559 |

* cited by examiner

*Primary Examiner* — Stanley Tso
(74) *Attorney, Agent, or Firm* — Pauley Erickson & Kottis

(57) ABSTRACT

An electrical enclosure for a lighting fixture. The enclosure includes an access door with a closure element that latches closed on or against the enclosure without a tool but requires a tool for unlatching the closure element to open the access door. The closure element includes a bias member or spring that is depressed and/or released by the tool.

12 Claims, 1 Drawing Sheet

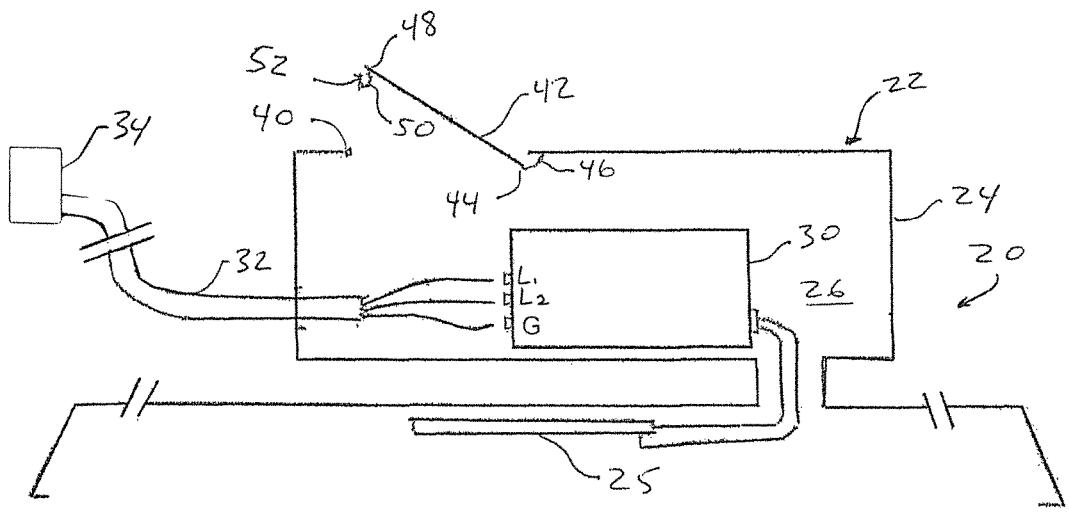
FIG. 1
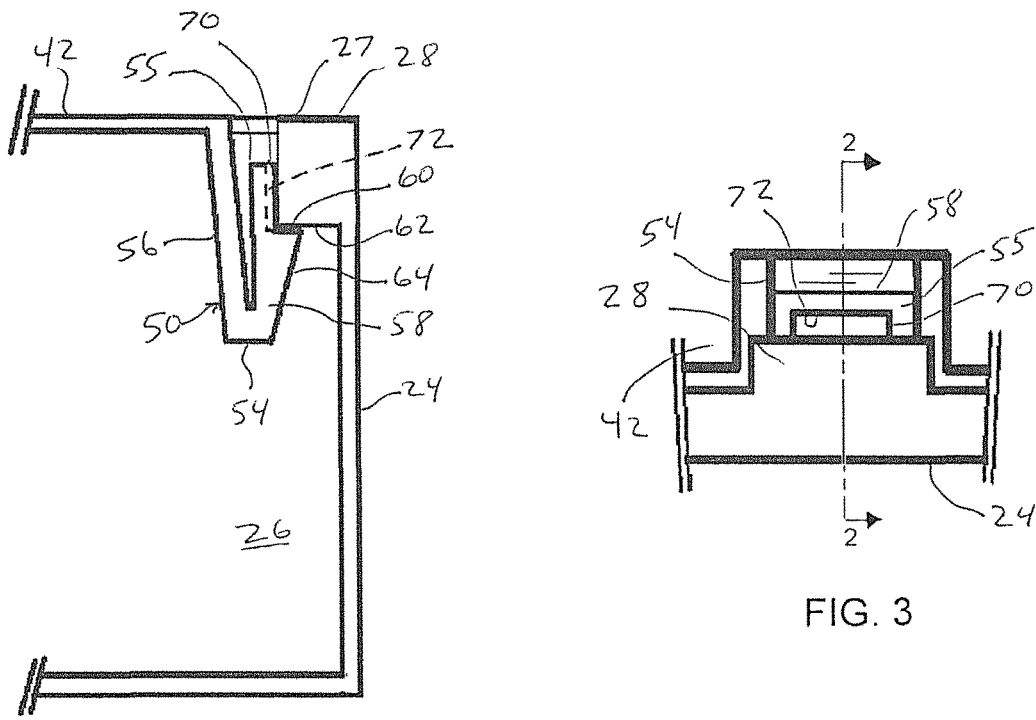
FIG. 2
FIG. 3

TOOL-LESS APPARATUS AND METHOD FOR SECURING LIGHTING ENCLOSURE COVER

CROSS REFERENCE TO RELATED APPLICATION

This application claims the benefit of U.S. Provisional Application Ser. No. 62/425,142, filed on 22 Nov. 2016. The parent application is hereby incorporated by reference herein in its entirety and is made a part hereof, including but not limited to those portions which specifically appear hereinafter.

BACKGROUND OF THE INVENTION

This invention relates generally to an electrical enclosure and, more particularly, to enclosure for a lighting fixture that meets safety regulations for tool-based access, but has easier, tool-less closing.

Lighting fixtures can be challenging to install within a building, especially ceiling or overhead fixtures. One reason for this is a common difficulty in making the electrical connections to the line voltage, which must be done prior to full fixture mounting. There are safety regulations, most notably UL 8750, that require the use of a tool to open the access panel of a fixture's electrical enclosure after the fixture has been installed. This is most often accomplished by using a screw to retain the access panel in the closed position. This screw typically has to be installed into the electrical enclosure while it is being installed in the ceiling. The overhead location of the fixture can make installing the screw problematic, as an electrician/installer is usually on a ladder or staging, trying to make electrical connections to heavy and/or awkward-to-handle lighting fixtures. There is a continuing need for improved lighting fixtures for ease of installation.

SUMMARY OF THE INVENTION

This invention provides an improved electrical enclosure that meets the enclosure access requirements for commercial safety regulations (for example UL 8750). This enclosure of this invention will provide the electrician/installer a way to close the access panel of the electrical enclosure without using external fasteners or tools. However, the invention also retains the requirement of a tool for the removal or opening of the access panel of the electrical enclosure per the established safety regulations.

The general object of the invention can be attained, at least in part, through an electrical enclosure for a lighting fixture. The enclosure includes a housing with an access opening and an access door mounted over the access opening. The access door includes a closure element with a tool access, wherein the closure element is configured to latch closed on or against the housing without a tool and require the tool for unlatching the closure element to open the access door. The closure element can include a bias member, such as a spring that flexes against the housing and is released only by a tool and not fingers. The closure element can also be recessed relative to a surface of the access door to restrict finger access to the closure element.

The invention further includes an electrical enclosure for a lighting fixture with a housing, an access opening, and an access door mounted over the access opening. The access door includes a first end connected to the housing, a second end opposite the first end, and a closure element at the second end of the housing. The closure element includes a spring, a detent surface that latches against a surface of the housing via the spring when the access door is in a closed position, and a tool access adjacent the detent surface configured to receive a tool to release the detent from the housing to open the access door. The spring desirably extends into a chamber of the housing and the closure element and the tool access can be disposed in a recess formed between the housing and the access door to restrict finger access.

The invention still further includes a method of using an electrical enclosure for a lighting fixture. The method includes: closing the access door to latch the closure element against the housing without any closure tool; inserting a release tool into a tool access of the closure element; and releasing the closure element via the opening tool to open the access door.

Other objects and advantages will be apparent to those skilled in the art from the following detailed description taken in conjunction with the appended claims and drawings.

BRIEF DESCRIPTION OF THE DRAWINGS

FIG. 1 shows an electrical enclosure according to one embodiment of this invention.

FIG. 2 shows an electrical enclosure closure element according to one embodiment of this invention.

FIG. 3 shows a top view of the closure element of FIG. 2.

DETAILED DESCRIPTION OF THE INVENTION

The invention relates to a device configured for easy installation of an electric lighting fixture while maintaining such safety agency requirements that restrict accidental access to high voltage wiring within the lighting fixtures electrical compartment. The present invention provides a cover for an electrical enclosure that can be closed without the use of tools. The enclosure of this invention will not allow a person to use their bare hands to remove the cover, and a tool will be required to remove the cover.

FIG. 1 shows a light fixture 20 with an electrical enclosure 22. The electrical enclosure 22 can be integral or separate and connected directly or indirectly to the light fixture 20. The electrical enclosure 22 includes a housing 24 enclosing a chamber 26 including an electrical connection element 30. The electrical connection element 30 connects an electrical line 32 from an electrical supply 34 to a light source 25 of the lighting fixture 20. The electrical connection element 30 can be any suitable electrical connection, and can be, include or be further connected to a ballast, driver, or other lighting power conversion device. As will be appreciated, the variations of the electrical connection element and the light source can vary depending on need and the type and/or power requirements of the light source (e.g., LED, halogen, fluorescent, etc.).

The electrical enclosure of embodiments of this invention include an access cover over an access opening that provides for tool-less installation of the access cover but that also requires a tool for removal of the access cover. As shown in FIG. 1, the electrical enclosure housing 24 includes an access opening 40. The size, shape, placement, and/or configuration of the access opening can vary, depending on need. Preferably, the access opening is positioned to allow an installer to connect the wires 32 to the electrical connection element 30. The electrical enclosure 22 includes an access door 42 mounted over the access opening 40. The access door can be any cover or panel connected at a first end 44 by a hinge 46 or other suitable connection to the housing, such as, without limitation, a tab and slot connection.

At a second end 48 that is opposite the first end 44, the access door 42 includes a closure element 50 for latching or otherwise locking the access door 42 to the housing 24 in a closed position. The closure element 50 is configured to flex and mechanically latch closed on or against the housing upon closing the door 42 without a need for a tool to perform the closing or latching/locking, but requires a tool for unlatching the closure element 50 to open the access door 42. The closure element 50 thus provides for quick and efficient installation, while not allowing opening by bare hands alone, thereby meeting safety requirements.

In embodiments of this invention, the closure element 50 includes a bias member 52 that presses against and exerts constant tension on the housing, or an element thereon, when closed, and returns to non-biased shape when released upon opening the access door 42. In the embodiment of FIGS. 2 and 3, the closure element 50 is embodied as a V- or U-shaped spring 54, extending from the access door 42 into the chamber 26 of the housing 24. The spring 54 includes a first spring segment 56 connected at one end to the access door 42 and at a second end to a second spring segment 58. When closed, the second spring segment 58 is flexed toward the first spring segment 56 by contact with the housing 24, or a latch element 28 thereof. The spring 54 includes a detent surface 60 on, in, and/or extending from the second spring segment 58. The detent surface 60 latches against a surface 62 of the housing 24 via the spring 54 to hold the access door 42 in the closed position shown in FIGS. 2 and 3.

The access door 42 is closed by hand and the second spring segment 58 is pushed against the latch element 28. The angled surface 64 of the second spring segment 58 deflects the second spring segment 58 until the detent surface 60 snaps into position to lock against the surface 62. The second spring segment 58 includes a tool access 70 adjacent the detent surface 60 that is configured to receive a tool to release the detent 60 from the housing 24 to open the access door 42. In FIGS. 2 and 3, the tool access 70 is a recess or slot in an end 55 of the second spring segment 58. The tool access 70 includes a tool surface 72 in the slot for receiving a tool pressing action to push the second spring segment 58 away from the latch element 28 and disengage the detent surface 60. The tool surface 72 is angled with respect to the detent surface 60, such as at the perpendicular angle shown in FIG. 2. The tool access 70 is configured to receive, for example, a screwdriver, but any suitable and correspondingly sized and/or shaped tool and tool access can be incorporated.

In embodiments of this invention, to further limit manipulation of the closure member by bare hands, the closure element is recessed relative to a surface of the access door. As shown in FIG. 2, the end 55 of the second spring segment 58 is recessed relative to the access door 42 and the housing latch element 28. In the embodiment of FIG. 2, at least a portion of an outer door surface 45 of the access door 42 is collinear in a surface plane with at least a portion of an adjacent housing surface 27, and the end 55 of the closure element 50 is inwardly offset from this surface plane.

Thus, the invention provides an electrical enclosure that allows for closing an access door and latching a closure element against the housing without any closure tool, and that requires inserting a release tool into a tool access of the closure element to releasing the closure element and open the access door. The enclosure provides for efficient installation while meeting safety requirements.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An electrical enclosure for a lighting fixture, comprising:
   a housing including an access opening;
   an access door mounted over the access opening, the access door including:
      a door surface,
      wherein at least a portion of the door surface of the access door is collinear in a surface plane with at least a portion of an adjacent housing surface of the housing; and
      a closure element with a tool access,
      wherein the closure element is configured to latch closed on or against the housing without a tool and require the tool for unlatching the closure element to open the access door,
      the closure element including an end offset from the surface plane,
      a detent surface that holds the closure element against the housing in a closed position,
      and a tool surface adjacent and perpendicular to the detent surface,
      the tool surface including a slot in the end of the closure element,
      the slot extending between the end of the closure element and the detent surface and configured to receive a tool to release the detent surface from the housing.

2. The electrical enclosure according to claim 1, wherein the closure element comprises a bias member.

3. The electrical enclosure according to claim 2, wherein the closure element comprises a spring.

4. The electrical enclosure according to claim 1, wherein the closure element is recessed relative to a surface of the access door.

5. The electrical enclosure according to claim 1, wherein the housing encloses an electrical connection element, wherein the electrical connection element connects an electrical line from an electrical supply to a light source of the lighting fixture.

6. An electrical enclosure for a lighting fixture, comprising:
   a housing including an access opening;
   an access door mounted over the access opening,
   the access door including a first end connected to the housing,
   a second end opposite the first end,
   and a door surface extending between the first end and the second end,
   wherein at least a portion of the door surface is collinear in a surface plane with at least a portion of an adjacent housing surface of the housing; and
   a closure element at the second end of the housing, the closure element including an end of the closure element offset from the surface plane,
a spring,
a detent surface that latches against a surface of the housing via the spring when the access door is in a closed position,
and a tool access adjacent the detent surface,
the tool access including a tool surface adjacent and perpendicular to the detent surface,
the tool surface comprising a slot in the end of the closure element,
the slot extending between the end of the closure element and the detent surface and configured to receive a tool to release the detent from the housing to open the access door.

7. The electrical enclosure according to claim 6, wherein the spring extends into a chamber of the housing.

8. The electrical enclosure according to claim 6, wherein the closure element and the tool access are disposed in a recess formed between the housing and the access door.

9. The electrical enclosure according to claim 8, wherein the slot is disposed in the recess formed between the access door and the housing.

10. The electrical enclosure according to claim 6, wherein the detent surface extends parallel to the surface plane.

11. The electrical enclosure according to claim 6, wherein the housing encloses an electrical connection element, wherein the electrical connection element connects an electrical line from an electrical supply to a light source of the lighting fixture.

12. A method of using an electrical enclosure for a lighting fixture according to claim 1, the method comprising:
 closing the access door to latch the closure element against the housing without any closure tool;
 inserting a release tool into a tool access of the closure element; and
 releasing the closure element via the opening tool to open the access door.

* * * * *